United States Patent
Nemeth et al.

(10) Patent No.: US 8,628,452 B2
(45) Date of Patent: Jan. 14, 2014

(54) METHOD AND DEVICE FOR CONTROLLING AN OUTPUT TORQUE OF AN AUTOMATED TRANSMISSION COUPLED TO AN INTERNAL COMBUSTION ENGINE

(75) Inventors: Huba Nemeth, Budapest (HU); Mathias Mayr, Germering (DE); Manuel Marx, Weichs (DE); Michael Herges, Munich (DE)

(73) Assignee: KNORR-BREMSE Systeme Fuer Nutzfahrzeuge GmbH, Munich (DE)

( * ) Notice: Subject to any disclaimer, the term of this patent is extended or adjusted under 35 U.S.C. 154(b) by 215 days.

(21) Appl. No.: 12/869,225

(22) Filed: Aug. 26, 2010

(65) Prior Publication Data
US 2011/0045949 A1  Feb. 24, 2011

Related U.S. Application Data

(63) Continuation of application No. PCT/EP2009/001256, filed on Feb. 20, 2009.

(30) Foreign Application Priority Data

Feb. 28, 2008  (DE) .......................... 10 2008 011 624

(51) Int. Cl.
*F02D 23/00* (2006.01)
*B60W 10/04* (2006.01)
*F02B 33/44* (2006.01)

(52) U.S. Cl.
USPC ............................. 477/32; 477/107; 60/611

(58) Field of Classification Search
USPC ......... 477/32, 33, 107, 108; 123/562; 60/609, 60/611, 612, 605.1
See application file for complete search history.

(56) References Cited

U.S. PATENT DOCUMENTS

| | | | |
|---|---|---|---|
| 5,064,423 A | | 11/1991 | Lorenz et al. |
| 5,109,826 A | * | 5/1992 | Kato ............................. 123/564 |
| 5,125,292 A | * | 6/1992 | Matsuoka et al. .............. 477/33 |

(Continued)

FOREIGN PATENT DOCUMENTS

| | | |
|---|---|---|
| DE | 39 06 312 C1 | 12/1989 |
| DE | 103 61 913 A1 | 9/2005 |

(Continued)

OTHER PUBLICATIONS

German Office Action dated Jun. 3, 2008 including English-language translation (Twelve (12) pages).

(Continued)

*Primary Examiner* — Roger Pang
(74) *Attorney, Agent, or Firm* — Crowell & Moring LLP (57) ABSTRACT

A method is provided for controlling an output torque of an automated transmission coupled to an internal combustion engine and having a transmission controller. The internal combustion engine includes an exhaust gas turbocharger and an injection air device for injecting air into an intake line. The method receives a torque requirement by the transmission controller, generates an injection air signal by the transmission controller based on the torque requirement and current operating parameters of the internal combustion engine and the automated transmission, and controls the output torque by activating the injection air device based on the injection air signal for injecting air into the intake line of the internal combustion engine for a duration to be determined. A corresponding device is provided for carrying out the method.

14 Claims, 3 Drawing Sheets

(56) References Cited

U.S. PATENT DOCUMENTS

| | | | |
|---|---|---|---|
| 5,133,188 A * | 7/1992 | Okada | 60/609 |
| 5,205,191 A * | 4/1993 | Takata et al. | 477/33 |
| 5,564,400 A * | 10/1996 | Nishimura et al. | 123/559.3 |
| 7,052,435 B2 * | 5/2006 | Tabata et al. | 477/107 |
| 7,210,296 B2 * | 5/2007 | Bolz et al | 60/608 |
| 7,665,302 B2 | 2/2010 | Nemeth et al. | |
| 7,975,666 B2 * | 7/2011 | Gokhale et al. | 123/179.18 |
| 8,282,528 B2 * | 10/2012 | Jager et al. | 477/32 |
| 2006/0207252 A1 * | 9/2006 | Isobe et al. | 60/601 |
| 2007/0213176 A1 * | 9/2007 | Fujii et al. | 477/107 |
| 2008/0072595 A1 | 3/2008 | Nemeth et al. | |
| 2010/0318268 A1 * | 12/2010 | Jager et al. | 701/54 |
| 2011/0045948 A1 * | 2/2011 | Doering et al. | 477/33 |
| 2012/0216533 A1 * | 8/2012 | Schaffeld et al. | 60/611 |

FOREIGN PATENT DOCUMENTS

| | | |
|---|---|---|
| DE | 10 2006 008 783 A1 | 9/2006 |
| DE | 10 2006 008 785 A1 | 3/2007 |
| EP | 1 255 031 A2 | 11/2002 |
| JP | 4-238746 A | 8/1992 |
| JP | 06248965 A * | 9/1994 |
| WO | WO 2006/089779 A1 | 8/2006 |
| WO | WO 2009/103588 A1 | 8/2009 |
| WO | WO 2009/103589 A1 | 8/2009 |

OTHER PUBLICATIONS

German Office Action dated May 19, 2009 including English-language translation (Eleven (11) pages).
International Search Report dated Nov. 3, 2009 including English-language translation(Six (6) pages).

* cited by examiner

METHOD AND DEVICE FOR CONTROLLING AN OUTPUT TORQUE OF AN AUTOMATED TRANSMISSION COUPLED TO AN INTERNAL COMBUSTION ENGINE

CROSS-REFERENCE TO RELATED APPLICATIONS

This application is a continuation of PCT International Application No. PCT/EP2009/001256, filed Feb. 20, 2009, which claims priority under 35 U.S.C. §119 from German Patent Application No. DE 10 2008 011 624.6, filed Feb. 28, 2008, the entire disclosures of which are herein expressly incorporated by reference.

BACKGROUND AND SUMMARY OF THE INVENTION

The invention relates to a method and a device for controlling an output torque of an automated transmission which is coupled to an internal combustion engine.

An automated transmission is the state of the art in modern vehicles, for example commercial vehicles. By means of a transmission control unit, an automated transmission carries out, independently of the driver and under electronic control, a gear speed selection for controlling an output torque of the transmission in order to adapt a torque of the internal combustion engine, and carries out a clutch-activation operation. The transmission control unit communicates electronically with other control units of the vehicle and in this way receives the necessary input signals such as, for example, the velocity of the vehicle, engine speed, driver's request, etc., calculates itself further physical variables such as, for example, the mass of the vehicle and/or gradient of the roadway, and carries out corresponding actions for the gear speed selection. In the event of a torque request by the driver, for example, by opening the throttle, the automated transmission shifts to a relatively high transmission ratio since the internal combustion engine supplies a relatively large torque in relatively high rotational speed ranges. The relatively high rotational speed not only brings about the relatively high torque but also disadvantageously results in higher fuel consumption.

Internal combustion engines such as a piston engine of the type of a diesel engine, are equipped with an exhaust gas turbocharger for increasing an intake pressure in an intake line for the internal combustion engine. These internal combustion engines have, during acceleration and specifically at a low engine speed, an operating state which is referred to as turbo lag. Here, when the throttle is opened, the internal combustion engine does not react by increasing the engine speed until after a specific time delay in which there is no exhaust gas energy available for driving the exhaust gas turbocharger and therefore no compressed intake air available at a corresponding intake pressure.

German patent document DE 103 61 913 A1 specifies a method of providing charge resistance with compressed air from a buffer accumulator for turbo lag in an internal combustion engine with an exhaust gas turbo-charger. This additional air is fed to the internal combustion engine downstream of the exhaust gas turbocharger in the direction of flow, via a control valve during operation in a rotational speed range with an inadequate torque. The control valve is controlled here by a regulator which receives pulses from the accelerator pedal and a rev counter.

EP 12 55 031 A2 describes a control system and a method for a vehicle having an internal combustion engine with a turbocharger and a transmission. The engine is controlled by an engine control unit, and the transmission is controlled by a transmission control unit. These control units communicate with one another. The internal combustion engine is equipped with an exhaust gas recirculation means and an associated valve. The exhaust gas recirculation means has a cooler. An air blower device for blowing in compressed air is not specified.

In order to get around the turbo lag, solutions have been proposed which are described, for example, in laid-open patent applications DE 10 2006 008 783 A1, DE 10 2006 008 785 A1 and WO 2006/089779 A1. An internal combustion engine with turbocharger has an air blower device for compressed air. Here, the air blower device is used to blow in compressed air, for example from a compressed air accumulator, in a controlled fashion into the intake line, specifically into the inlet manifold, of the internal combustion engine, in order to cover the intake air demand of the internal combustion engine when said demand increases. This specified device and this specified method have the object of improving the acceleration behavior of the commercial vehicle with a turbocharged piston internal combustion engine, i.e. of increasing the acceleration capability.

The object of the present invention is to make available a method and a device for controlling an output torque of an automated transmission which is coupled to an internal combustion engine while taking into account operating parameters of the internal combustion engine and of the automated transmission, in which case the above disadvantages are significantly reduced and further advantages are provided.

The object is achieved with a method and device for controlling an output torque of an automated transmission which is coupled to an internal combustion engine and has a transmission control unit, wherein the internal combustion engine has an exhaust gas turbocharger and an air blower device for blowing air into an intake line. A torque request is received by the transmission control unit, which generates an air blowing-in signal on the basis of the torque request and current operating parameters of the internal combustion engine and of the automated transmission. The output torque is controlled by activating the air blower device on the basis of the air blowing-in signal in order to blow air into the intake line of the internal combustion engine for a definable time period.

When there is a torque request and on the basis of current operating parameters of the internal combustion engine and of the automated transmission, a transmission control unit generates an air blowing-in signal which activates the air blower device for a definable time period. As a result, advantageous control of an output torque of the automated transmission is achieved in that, for example, shifting processes for increasing the output torque are reduced in frequency or avoided, as a result of which there is a saving in fuel since the internal combustion engine maintains its rotational speed which is favorable in terms of consumption, but its torque is increased by the blown-in air.

A shifting strategy of the transmission control unit of an automated transmission for shifting gear speeds and for controlling the clutch can be advantageously adapted to these possibilities of a rapid increase in torque and expanded torque range of a turbocharged internal combustion engine. In this context, the blowing-in process which is initiated by the air blowing-in signal is selectively integrated into the shifting strategy of the transmission, i.e. the transmission control unit activates the air blower device in such a way that air is blown in in accordance with the air blowing-in control signal. In this context it may also be possible for the air blowing-in control signal to define, for example, the duration, pressure and/or quantity of blowing-in air through its shape and/or chronological length.

The transmission control unit is connected to an air blowing-in control unit. Of course, the transmission control unit can be part of an engine control unit. It is also possible for the air blowing-in control unit to be a component of the transmission control unit and/or engine control unit.

A method according to the invention for controlling an output torque of an automated transmission which is coupled to an internal combustion engine and has a transmission control unit, wherein the internal combustion engine has an exhaust gas turbocharger and an air blower device for blowing air into an intake line, includes the following method steps:

(a) reception of a torque request by the transmission control unit;

(b) generation of an air blowing-in signal by the transmission control unit on the basis of the torque request and current operating parameters of the internal combustion engine and of the automated transmission; and (c) control of the output torque by activating the air blower device on the basis of the air blowing-in signal in order to blow air into the intake line of the internal combustion engine for a definable time period.

A device according to the invention for controlling an output torque of an automated transmission having a transmission control unit, which transmission is coupled to an internal combustion engine having an exhaust gas turbocharger, includes:

(a) an engine control unit for controlling the internal combustion engine and generating and/or passing on torque requests for the transmission control unit; and (b) an air blower device having an air blowing-in feed section with an air blowing-in control unit for the controlled feeding of blowing-in air into an intake line of the internal combustion engine, wherein the transmission control unit is designed to generate an air blowing-in signal on the basis of the torque request and current operating parameters of the internal combustion engine and of the automated transmission, and wherein the transmission control unit is connected to the air blowing-in control unit in order to control the output torque.

Such integration of the blowing-in process for air, for example compressed air, from a reservoir or compressed air vessel, into a switching strategy of the automated transmission allows an advantageous saving in fuel in that shifting processes for increasing the output torque are reduced or avoided. The shifting processes normally assume a relatively high transmission ratio (for example when there is a torque request above what is referred to as a kick down) since the internal combustion engine has a relatively high torque at relatively high rotational speed ranges. However, the relatively high rotational speed also means relatively high fuel consumption. In the event of a torque request and current operating parameters of the internal combustion engine and of the automated transmission, according to the invention an air blowing-in signal is generated which causes air to be blown into the intake line of the internal combustion engine, as a result of which the torque of the internal combustion engine is increased while the rotational speed essentially stays the same and therefore a rotational speed which is favorable in terms of consumption is maintained. A shifting process to a relatively high transmission ratio is not necessary or can take place in a delayed fashion, for example after the blowing-in process has ended.

The current operating parameters of the internal combustion engine may be, for example, its rotational speed, temperature, load, and torque. Current operating parameters of the automated transmission are, for example, the selected gear speed, the shifting process, the clutch operation process, the intermediate throttle-opening process, the intermediate clutch operation process, and the like.

In certain cases it may also be advantageous that switching to another transmission ratio occurs after a delay during the blowing-in process or occurs together with it.

In addition to such avoidance of shifting processes to relatively high transmission ratios, a switching point at which the transmission performs the shifting process to a relatively low gear speed can be adjusted in the direction of relatively low rotational speeds of the internal combustion engine, since with the blowing-in process when the output torque is controlled a shifting process of the automated transmission to a relatively low transmission stage occurs on the basis of a torque request for decreasing the torque after the activation of the air blower device has ended, and in this context a relatively large engine torque, i.e. torque of the internal combustion engine, is present.

Furthermore, it may also be possible that the transmission shifts into a relatively high gear speed earlier during acceleration processes, that is to say together with the blowing-in process or during the blowing-in process, and therefore avoids phases of a high engine speed which correspond to relatively high fuel consumption. This is because after the shifting process a possible lack of sufficient engine torque can be compensated by selectively blowing in air.

It is also possible for one or more gear speeds to be bypassed when shifting up or shifting down.

The air blowing-in signal can be generated on the basis of the torque request and current operating parameters of the internal combustion engine and of the automated transmission, which is carried out, for example, by the transmission control unit in which the shifting strategy can be present, for example as software of a microcontroller system. The air blowing-in signal can therefore be advantageously adapted in a flexible way to operating conditions.

The transmission control unit is preferably connected to an engine control unit or another control unit of the internal combustion engine for communicating in order to receive torque requests and current operating parameters of the internal combustion engine. In this context, the other control units can have the following devices for generating a change in torque: automatic cruise controller; electronic stability controller; traction controller; driver assistance systems, and the like.

In a further embodiment, when an air blowing-in signal is generated, operating parameters of the exhaust gas turbocharger such as, for example, rotational speed, delivery capacity and/or compressor pressure are taken into account. It is possible here for the rotational speed of the turbocharger to be measured by way of a rotational speed sensor which is connected, for example, to the transmission control unit. The delivery quantity of the turbocharger can also be calculated from various input signals, for example of the engine control unit, by the transmission control unit. Likewise, a compressor pressure can be determined by use of a sensor which also communicates with the transmission control unit.

This is advantageous, for example, if when travelling at a constant speed and with a medium rotational speed of the internal combustion engine, an acute torque request is made by the driver. In this context, when the delivery quantity of the exhaust gas turbocharger is known the transmission control unit can detect whether the compressor pressure of the exhaust gas turbocharger is sufficient and, if appropriate when the compressor pressure is not sufficient, it can accelerate the build-up of compressor pressure by correspondingly blowing in air. This avoids the situation in which only what is referred to as shifting down enables the transmission to meet the driver's request to increase the torque and this brings about increased fuel consumption.

The definable time period for the blowing in of air can be defined by an operating parameter of the air blowing-in signal. It is therefore possible, for example, to define, and also change, the blowing-in process by use of a chronological length of the air blowing-in signal. It is also possible for the definable time period to be switched on by the air blowing-in signal in the form of a starting pulse and to be switched off in the form of a stop pulse. Pulse sequences, for example with a variable frequency, are also possible. In this context it is decisive that the air blowing-in signal has a high degree of immunity to faults.

It is known that an unsynchronized manual shift transmission in a heavy commercial vehicle is shifted up by double activation of the clutch (referred to as "double declutching") and shifted down by what is referred to as "double declutching with opening of the throttle". The shifting method in a commercial vehicle which is equipped with an automated and unsynchronized step-by-step variable-speed transmission has a similar method sequence to that carried out by the driver during manual shifting.

A significant advantage of an automated step-by-step variable-speed transmission consists in the fact that the shifting is carried out in a shorter time than is required for manual shifting by a driver. This results in a shorter time with a loss of traction force compared to a manual shift transmission. There are commercial vehicles, for example in the construction industry, in which it is highly significant that the vehicle operates with a loss of traction force for as short a time as possible. This automated shifting process contains a plurality of method steps, one of which is "double declutching with opening of the throttle", as a result of which the piston internal combustion engine is briefly accelerated in order to reach the required rotational speed for synchronizing the gear stages. The input shaft of the transmission can then be accelerated by briefly closing the clutch at the synchronous speed. During shifting up, double declutching occurs without opening the throttle. The greatest amount of time required for this double declutching process with opening of the throttle is the acceleration of the internal combustion engine since an engine of a turbocharged design can be operated only at very low charge pressures in this operating state. This results in a similar torque to that of an induction engine. This acceleration can be improved significantly in that, in this intermediate throttle-opening phase, the air blowing-in signal is generated for a definable time period and blowing-in air is blown in, as a result of which the rotational speed of the engine is increased at a higher charge pressure. This intermediate throttle-opening phase can therefore be reduced by approximately 50 to 70%.

The response behavior plays a significant role when a vehicle with a turbocharged internal combustion engine is accelerated out of a stationary state. In the case of a poor response behavior (for example on a positive gradient of a roadway) the driver will attempt to implement a sufficiently large traction force by means of high rotational speeds and a correspondingly high clutch slip. This results in high loading of the components with a high degree of wear of the clutch lining, for example a burnt clutch lining. In a further design there is then provision for the air blowing-in signal to be generated for a definable time period during a starting process. This triggers selective blowing-in of compressed air, as a result of which the required engine speed during the acceleration process of a turbocharged internal combustion engine out of the stationary state is kept at a significantly lower level than it would be without it. However, this requires the activation of the clutch to be adapted. This results in a relatively short clutch operation phase and improved gradient-climbing capacity. At the same time, the loading on the components is reduced significantly and the service life of the clutch is increased.

In one preferred embodiment there is provision for the air blowing-in feed section to be a fresh gas line section of a device for supplying fresh air for the controlled blowing in of compressed air.

By applying the method described above, the internal combustion engine is able to cover effectively an extended engine speed range. This permits the gear speed of the transmission or transmissions used to be reduced, which saves costs and reduces the amount of installation space required for the transmission. At the same time, this results in a reduction in weight with associated reduced consumption of fuel.

It is contemplated that the air blower device has a separate control unit for controlling it or that it is controlled by the engine control unit or the transmission control unit or some other control unit of a vehicle which performs at least one further control task and which is also designed for controlling the air blower device. The functional linking which is provided according to the claims is essential.

Other objects, advantages and novel features of the present invention will become apparent from the following detailed description of one or more preferred embodiments when considered in conjunction with the accompanying drawings.

DETAILED DESCRIPTION OF THE DRAWINGS

Identical components with an identical or similar function are provided with the same reference symbols in the figures.

Figure 1:
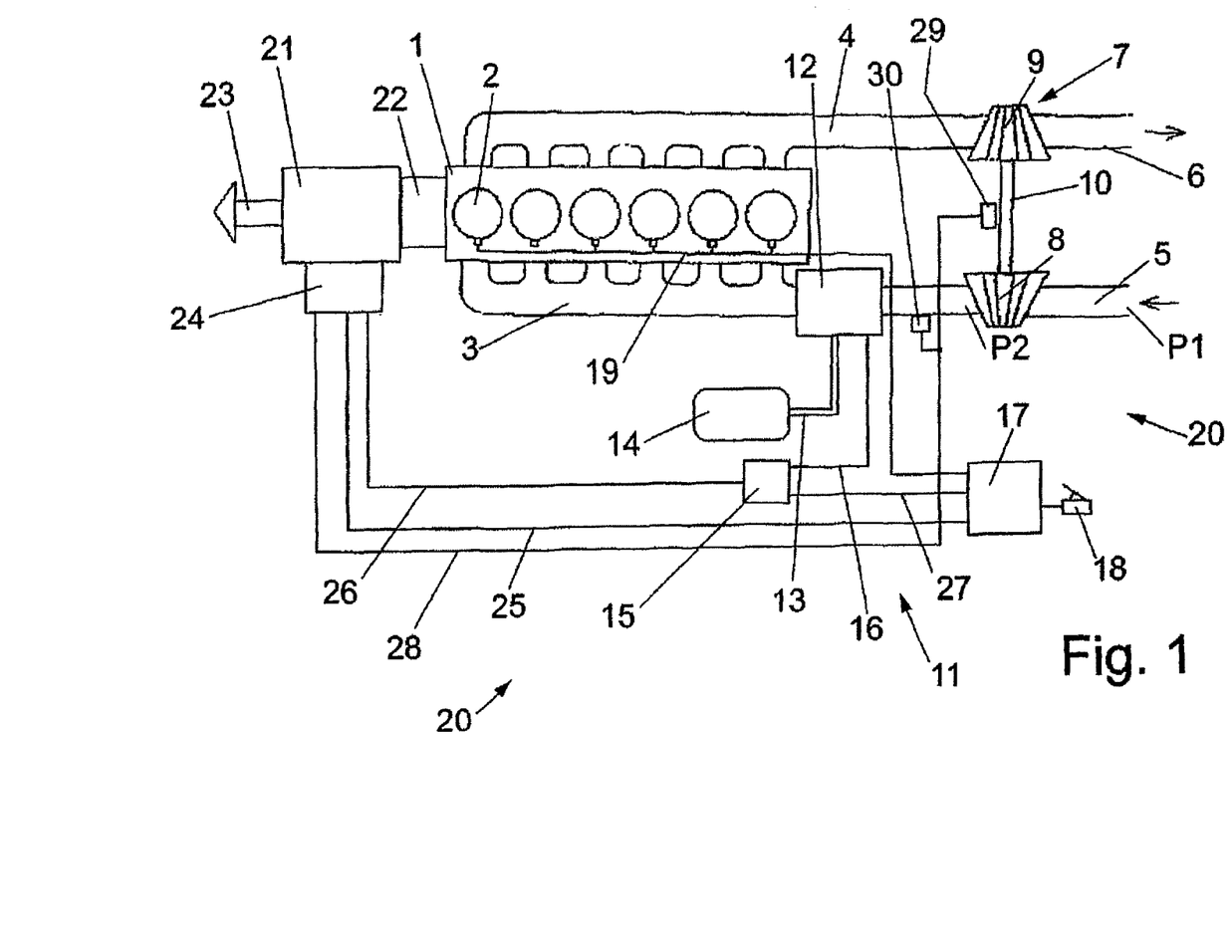
FIG. 1 shows a schematic illustration of an internal combustion engine with a first exemplary embodiment of a device according to the invention for controlling an output torque.

FIG. 1 shows a schematic illustration of an internal combustion engine 1 with a first exemplary embodiment of a device 20 according to the invention for controlling an output torque of a transmission output 23 of an automated transmission 21. The transmission output 23 is connected to a drive train (not shown) of wheels of a vehicle (likewise not shown). The automated transmission 21 is coupled here via a clutch 22 to the internal combustion engine 1, which is shown here schematically as a diesel engine with six cylinders 2, an intake line (manifold) 3 and an exhaust line (manifold) 4. The automated transmission 21 has a transmission control unit 24 which is described in more detail below.

The intake line 3 is connected via an air blowing-in feed section 12 to a compressor 8 of an exhaust gas turbocharger 7, which is connected to the air inlet 5 for fresh air with an inlet pressure P1. The compressor 8 of the exhaust gas turbocharger 7 is coupled via a shaft 10 to an exhaust gas turbine 9, which is arranged in the exhaust line 4 upstream of an exhaust gas outlet 6 for exhaust gas of the internal combustion engine 1. The exhaust gas turbocharger 9 is driven by the exhaust gas. When the internal combustion engine 1 is operating, the compressor 8 generates a compressor pressure P2 as a function of the exhaust gas flow rate and pressure of the internal combustion engine.

In this example, the air blowing-in feed section 12 continues to be connected to an air blowing-in line 13 for feeding compressed air from an air blowing-in vessel 14, which may be, for example, a compressed air vessel. The compressed air is fed in a controlled fashion via a valve (not shown) by way of an air blowing-in control unit 15, which is connected to the air blowing-in feed section 12 via an air blowing-in control line 16. The air blowing-in feed section 12 is, in this example, a fresh gas line section or fresh air line section such as is described in DE 10 2006 008 783 A1 and DE 10 2006 008 785 A1 in conjunction with an associated compressed air generating device. For this reason, a more detailed explanation will not be given. The air blowing-in feed section 12 with air blowing-in line 13 and air blowing-in vessel 14 and the air blowing-in control unit 15 with air blowing-in control line 16 generally form the air blower device 11.

An engine control unit 17 is connected to injection systems of the cylinders 2. In this respect, just one control line 19 is indicated symbolically. A control connection 27 is connected to an air blowing-in control unit 15 of the air blowing-in feed section 12. The engine control unit 17 controls the internal combustion engine 1 in a known fashion and is not explained in more detail. It is connected to an accelerator pedal 18 for receiving driver's requests. Furthermore, the engine control unit 17 can be connected to further control units (not illustrated), for example to a cruise controller and the like.

The automated transmission 21 and the clutch 22 are controlled by the transmission control unit 24. The clutch 22 can also be a component of the transmission 21 and is not explained in more detail. The transmission control unit 24 is connected to the engine control unit 17 for receiving torque requests, for example acceleration etc., via an engine control connection 25.

The transmission control unit 24 is also connected to the air blowing-in control unit 15 via an air blowing-in control connection 26. In this example, the transmission control unit is also connected via line 28 to a rotational speed sensor 29 for determining a rotational speed of the exhaust gas turbocharger 7, and to a pressure sensor for 30 determining the compressor pressure P2.

In the event of a torque request, for example by means of a driver's request via the accelerator pedal 18, this torque request is passed onto the transmission control unit 24 via the engine controller 17 and the engine control connection 25. If a double declutching process with opening of the throttle and/or a double declutching process without opening of the throttle of the automated transmission 21 is associated with this, as will be explained below in more detail, these operating states of the transmission 21 are also covered by the transmission control unit 24 itself. The function of the engine control unit 17 is not explained here.

The transmission control unit 24 subsequently generates an air blowing-in signal on the basis of the torque request, which air blowing-in signal is transmitted to the air blowing-in control unit 15 via the air blowing-in control connection 26. The air blowing-in control unit 15 subsequently activates, via the connections described above, the air blowing-in feed section 12 to blow in compressed air from the air blowing-in vessel 14 into the intake line 3 of the internal combustion engine 1, as a result of which the torque of the internal combustion engine 1 is increased while the rotational speed stays the same, as a result of which a shifting process of the transmission 21 to another gear speed in order to control the output torque at the transmission output 23 is not necessary. This can be done after the activation of the air blowing-in process or even during such process. This is not necessary from the transmission control unit 2. This can take place after the activation of this air blowing-in process or even during it. This is decided by the transmission control unit 24 on the basis of operating parameters of the internal combustion engine 1 which the transmission control unit 24 receives from the engine control unit 17, said decision being adapted on an individual basis to the operating state. As a result it is possible that before each gear speed selection the air blowing-in process is also included in the gear speed selection when there is a torque request, as a result of which fuel is saved and also there is less wear of the transmission components.

The connection of the transmission control unit 24 to the rotational speed sensor 29 and to the pressure sensor 30 serves in this example also to integrate the delivery capacity of the exhaust gas turbocharger 7 into the shifting strategy of the transmission control unit 24. If, for example when travelling at a constant speed with a medium rotational speed of the internal combustion engine 1, an acute torque request occurs, it is possible, given a known delivery quantity of the exhaust gas turbocharger 7, that the transmission control unit 24 would detect by means of the pressure sensor 30 whether or not the compressor pressure P2 is sufficient. If the compressor pressure P2 is not sufficient, the transmission control unit 24 can accelerate the build-up of the compressor pressure through an air blowing-in process via an air blowing-in control signal, in which case at the same time shifting down with the relatively high fuel consumption is avoided or delayed.

Figure 2:
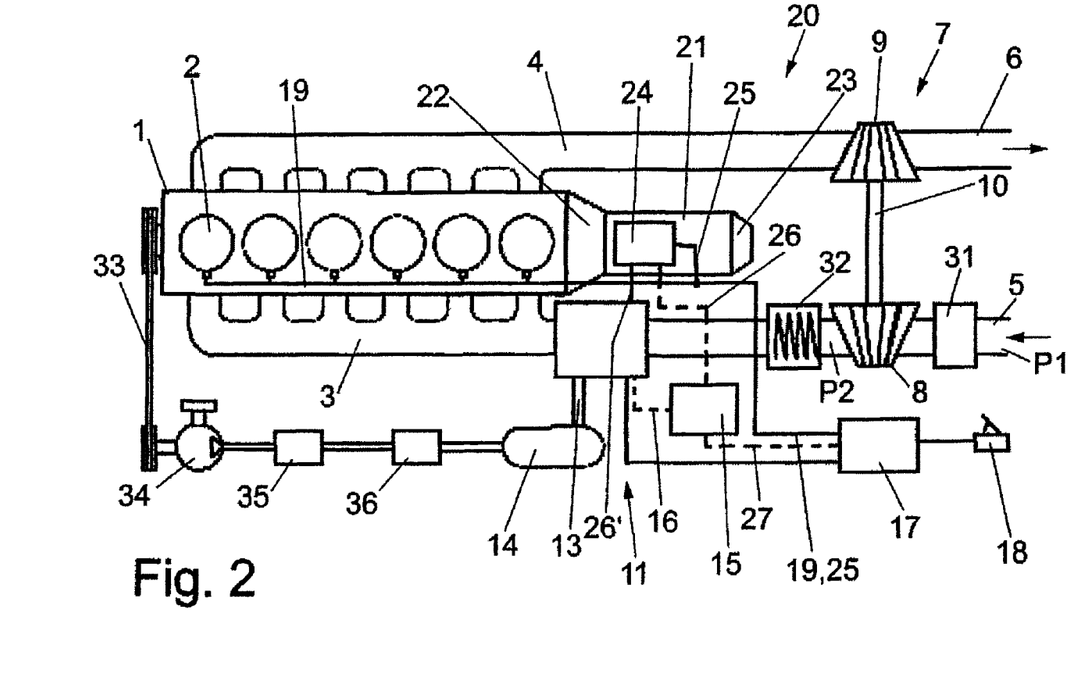
FIG. 2 shows a schematic illustration of an internal combustion engine with a second exemplary embodiment of the device according to the invention for controlling an output torque.

A second exemplary embodiment of an internal combustion engine 1 is illustrated in FIG. 2. The description which has already been made of FIG. 1 also applies here. In this example, a compressed air generating process for storing the blowing-in air in the air blowing-in accumulator 14 is illustrated. A compressor 34 is continuously driven by the crankshaft of the internal combustion engine 1 by a belt drive 33. The compressor 34 compresses air and supplies it to the air blowing-in accumulator 14 via a pressure regulator 35 and an air drier 36. This ensures that sufficient blowing-in air is present at all times for the method according to the invention. Excess compressed air can be stored, for example, in a further vessel for other purposes.

An air filter 31 is arranged here upstream of the compressor 8 in the direction of flow in the intake line, and a heat exchanger 32 is arranged downstream of the compressor 8. A further heat exchanger can also be provided for the blowing-in air.

Furthermore, FIG. 2 shows variants of the control connections. The engine control unit 17 is connected directly to the air blowing-in feed section 12 for controlling it (unbroken line). The engine control unit 17 also communicates via the control lines 19 and 25 with the transmission control unit 24 which is itself also connected directly to the air blowing-in feed section 12 via an air blowing-in control connection 26'. As a result, for specific operating states (for example turbo lag), the engine control unit 17 can control the air blowing-in feed section 12 independently of the transmission control unit 24, and the transmission control unit 24 can control the air blowing-in feed section 12 independently of the engine control unit 17.

Another embodiment is specified by the dashed control connections 16, 26 and 27. In this case, a separate air blowing-in control unit 15 is provided which communicates with the engine control unit 17 via the control connection 27, and with the transmission control unit 24 via the air blowing-in control unit 26. The air blowing-in feed section 12 is controlled only by this air blowing-in control unit 15 as a function of these communications. Of course, other arrangements are also possible.

FIGS. 3*a-g* show graphic illustrations of the behavior of vehicle parameters of the vehicle 40 in the process of driving up a roadway with a positive gradient. All the sections in the figures are arranged one on top of the other and linked by a time axis t.

Figure 3:
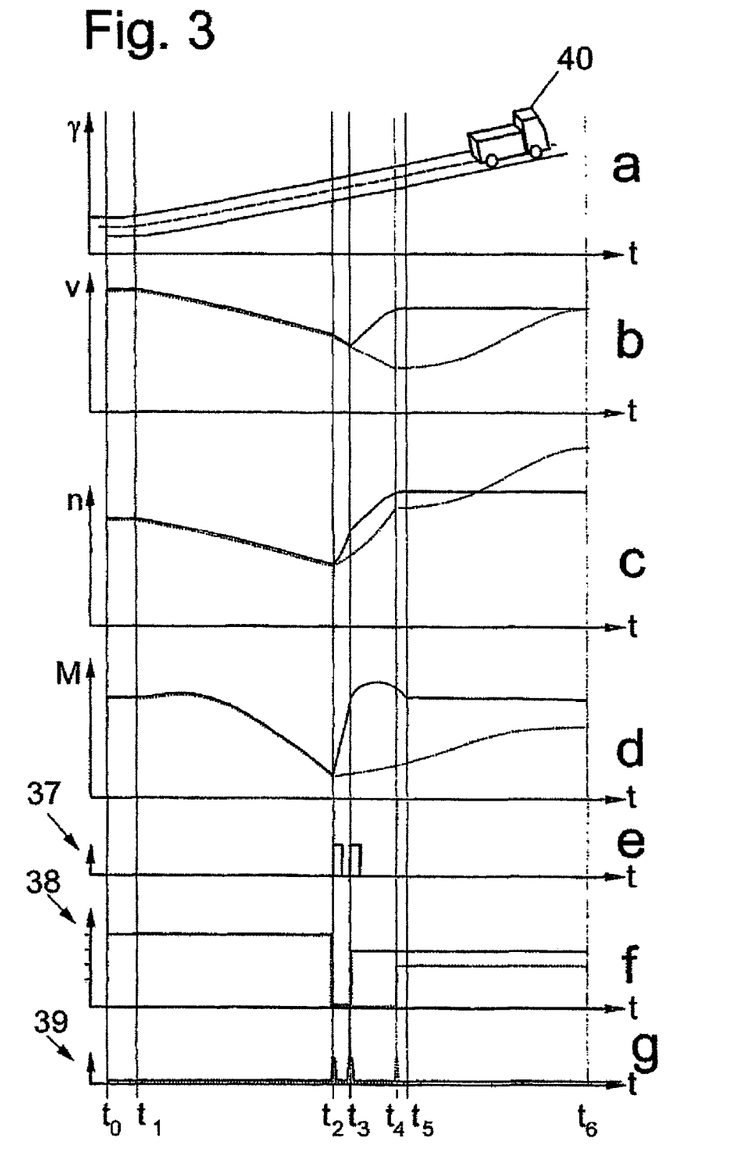
FIGS. 3a-3g are graphic representations of behavior of vehicle parameters of a vehicle in the process of driving up a roadway with a positive gradient.

FIG. 3*a* shows a vehicle 40 on a roadway with a positive gradient with an angle of positive gradient γ. FIG. 3*b* shows below it an assigned vehicle velocity v. FIG. 3*c* illustrates an associated engine speed n, which is linked to an engine torque M which is shown in FIG. 3*d*. FIG. 3*e* illustrates blowing-in processes 37, and FIG. 3*f* illustrates transmission shifting processes. Finally, FIG. 3*g* shows associated clutch operation processes 38.

In FIGS. 3*b* to 3*g*, the continuous curves respectively correspond to the device according to the invention with an air blower device 11, while the dashed curves do not have said air blower devices 11.

At the time $t_0$, the vehicle 40 is traveling on flat ground. At $t_1$, a positive gradient in the roadway begins. Shifting down starts at the time $t_2$. Here, the clutch is firstly actuated for what is referred to as the double declutching process with opening of the throttle, the idling mode is initiated, the clutch is released and then the throttle is fully opened (depending on the positive gradient), shifting down is carried out and the clutch is engaged again. In the case of the air blower device 11, the device is activated by the air blowing-in signal which is generated on the basis of the operating parameters of the internal combustion engine 1 and of the automated transmission 21.

At the time $t_3$, the transmission is synchronized in the vehicle with the air blower device 11. Since only a very short time has passed, the vehicle velocity v is lowered only slightly during the shifting down process. It is therefore sufficient to shift down just one gear speed. In order to speed up further the building up of engine torque M, further blowing in of blowing-in air can occur.

The transmission without the air blower device 11 is only now synchronized at the time $t_4$. Since a large amount of time has passed, it is necessary to shift back two gear speeds.

At the time $t_5$, the vehicle 40 with the air blower device 11 has already reached its final velocity v. Since it only had to shift back one gear speed, it travels from this time on at a rotational speed n which is favorable for consumption.

The vehicle 40 without an air blower device 11 has only now reached its final velocity v at the time $t_6$. It was necessary to shift back two gear speeds. It therefore now travels at a high rotational speed n which is not favorable for consumption.

In the case of what is referred to as the double declutching process during shifting up the clutch is firstly activated, the idling mode initiated, the clutch released and shortly after that activated again in order to shift up into the next gear speed and it is then released again.

The invention is not restricted to the exemplary embodiment described above. It can be modified within the scope of the patent claims. It is therefore possible, for example, to configure the transmission control unit 24 to calculate the operating parameters of the exhaust gas turbocharger 7 from other input signals, for example from the engine control unit 17, by way of a corresponding algorithm.

The air blowing-in feed section 12 can be a fresh gas line section of the compressed air device described in DE 10 2006 008 783 A1 and DE 10 2006 008 785 A1 and coupled thereto. The transmission control unit 24 can also be embodied as a component of the engine control unit 17 which is configured for this control task or of some other control unit or the like. However, it can also be embodied as a stand-alone control unit. The blowing-in air for the air blower device 11 can also originate from another source, for example directly from a compressor.

The length of the air blowing-in signal can be varied. It is also possible for it to be repeated at certain time intervals or to be composed of a plurality of individual signals of the same length or of different lengths and/or shape.

| Table of Reference Numerals | |
|---|---|
| 1 | Internal combustion engine |
| 2 | Cylinder |
| 3 | Intake line |
| 4 | Exhaust line |
| 5 | Air inlet |
| 6 | Exhaust gas outlet |
| 7 | Exhaust gas turbocharger |
| 8 | Compressor |
| 9 | Exhaust gas turbine |
| 10 | Shaft |
| 11 | Air blower device |
| 12 | Air blowing-in feed section |
| 13 | Air blowing-in line |
| 14 | Air blowing-in accumulator |
| 15 | Air blowing-in control unit |
| 16 | Air blowing-in control line |
| 17 | Engine control unit |
| 18 | Accelerator pedal |
| 19 | Control line |
| 20 | Device |
| 21 | Transmission |
| 22 | Clutch |
| 23 | Transmission output |
| 24 | Transmission control unit |
| 25 | Engine control connection |
| 26, 26' | Air blowing-in control connection |
| 27 | Control connection |
| 28 | Sensor connection |
| 29 | Rotational speed sensor |
| 30 | Pressure sensor |
| 31 | Air filter |
| 32 | Heat exchanger |
| 33 | Belt drive |
| 34 | Compressor |
| 35 | Pressure regulator |
| 36 | Air drier |
| 37 | Blowing-in process |
| 38 | Transmission shifting process |
| 39 | Clutch operation process |
| 40 | Vehicle |
| n | Engine speed |
| M | Engine torque |
| P1 | Inlet pressure |
| P2 | Compressor pressure |
| $t, t_0 \ldots {}_6$ | Time |
| v | Vehicle velocity |
| γ | Angle of positive gradient |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an output torque of an automated transmission coupled to an internal combustion engine and having a transmission control unit, the internal combustion engine having an exhaust gas turbocharger and an air blower device for blowing air from a source outside of an intake line into the intake line, the air blower device being separate from an intake air compressor section of the exhaust gas turbocharger, the method comprising the acts of:
- receiving, by the transmission control unit, a torque request;
- generating, by the transmission control unit, an air blowing-in signal as a function of the torque request and current operating parameters of the internal combustion engine and the automated transmission;
- controlling the output torque by activating the air blower device based on the air blowing-in signal in order to blow air into the intake line of the internal combustion engine downstream of the exhaust gas turbocharger compressor for a definable time period, and either
- performing a shifting process of the automated transmission to a relatively high transmission ratio in an event of a torque request to increase torque when the output torque is being controlled, at least one of during the activation of the air blower device and after activation of the air blower device ends, or
- performing a shifting process of the automated transmission to at least one relatively low transmission ratio in an event of a torque request to decrease torque when the output torque is being controlled after activation of the air blower device ends.

2. The method according to claim 1, wherein the act of performing a shifting process of the automated transmission in an event of a torque request to increase torque when the output torque is being controlled, includes no shifting of the automated transmission.

3. The method according to claim 1, wherein the transmission control unit communicates with an engine control unit or one or more other control units of the internal combustion engine to receive the torque requests and current operating parameters of the internal combustion engine.

4. The method according to claim 3, wherein said one or more other control units function as at least one of an automatic cruise controller, an electronic stability controller, a traction controller, and a driver assistance system controller, for generating a change in torque.

5. The method according to claim 1, wherein the generating act factors into account operating parameters of the exhaust gas turbocharger, said operating parameters comprising at least one of a rotational speed, a delivery capacity, and a compressor pressure.

6. The method according to claim 1, wherein the definable time period for the blowing-in of air is defined as a function of an operating parameter of the air blowing-in signal.

7. The method according to claim 1, wherein the air blowing-in signal is generated for a definable time period during a double declutching process with opening of a throttle for the internal combustion engine.

8. The method according to claim 1, wherein the air blowing-in signal is generated for a definable time period during a starting process.

9. A device for controlling an output torque of an automated transmission having a transmission control unit, which automated transmission is coupled to an internal combustion engine having an exhaust gas turbocharger, the device comprising:
- an engine control unit for controlling the internal combustion engine and providing torque requests for the transmission control unit; and
- an air blower device having an air blowing-in feed section with an air blowing-in control unit for controlled feeding of blowing-in air from a source outside of an intake line into the intake line of the internal combustion engine;
- for blowing air intake line, the air blower device being separate
- wherein the transmission control unit is operatively configured to generate an air blowing-in signal as a function of the torque request and current operating parameters of the internal combustion engine and of the automated transmission, and further wherein the transmission control unit is operatively coupled to the air blowing-in control unit in order to control the output torque such that either
  - the automated transmission is shifted to a relatively high transmission ratio in an event of a torque request to increase torque when the output torque is being controlled, at least one of during the activation of the air blower device and after activation of the air blower device ends, or
  - the automated transmission is shifted to at least one relatively low transmission ratio in an event of a torque request to decrease torque when the output torque is being controlled after activation of the air blower device ends.

10. The device according to claim 9, wherein the transmission control unit is operatively configured to determine a delivery quantity of a compressor of the exhaust gas turbocharger and a compressor pressure.

11. The device according to claim 10, wherein the transmission control unit is at least one of operatively coupled to sensors in order to determine the delivery quantity and the compressor pressure, and is operatively configured to calculate said delivery quantity and said compressor pressure.

12. The device according to claim 9, wherein the air blowing-in feed section is a fresh gas line section of a device for supplying fresh air for the controlled blowing-in of compressed air.

13. The device according to claim 9, further comprising a separate control unit operatively configured for controlling the air blower device.

14. The device according to claim 9, wherein the air blower device is controlled by one of the engine control unit, the transmission control unit, and one or more other control units of a vehicle, said one or more other control units performing an additional control task.

* * * * *